(12) United States Patent
Mordvinova et al.

(10) Patent No.: US 8,346,722 B2
(45) Date of Patent: Jan. 1, 2013

(54) REPLICA PLACEMENT STRATEGY FOR DISTRIBUTED DATA PERSISTENCE

(75) Inventors: Olga Mordvinova, Heidelberg (DE); Oleksandr Shepil, Heidelberg (DE)

(73) Assignee: SAP AG, Walldorf (DE)

( * ) Notice: Subject to any disclaimer, the term of this patent is extended or adjusted under 35 U.S.C. 154(b) by 352 days.

(21) Appl. No.: 12/623,669

(22) Filed: Nov. 23, 2009

(65) Prior Publication Data

US 2011/0125704 A1     May 26, 2011

(51) Int. Cl.
*G06F 17/00*     (2006.01)
(52) U.S. Cl. ........ 707/610; 707/626; 707/770; 707/638; 707/639
(58) Field of Classification Search .................. 707/610, 707/626, 770, 634, 638, 639
See application file for complete search history.

(56) References Cited

U.S. PATENT DOCUMENTS

| | | | | |
|---|---|---|---|---|
| 7,685,109 B1 * | 3/2010 | Ransil et al. | ........... | 707/999.003 |
| 7,801,912 B2 * | 9/2010 | Ransil et al. | .................. | 707/770 |
| 7,904,423 B2 * | 3/2011 | Vermeulen et al. | ........... | 707/626 |
| 8,046,326 B2 * | 10/2011 | Ameling et al. | .............. | 707/610 |

OTHER PUBLICATIONS

Atul Adya et al; Farsite: Federated, Available, and Reliable Storage for an Incompletely Trusted Environment; Proceedings of 5th Symposium on Operating Systems Design and Implementation (OSDI 2002); 14 pages (https://eprints.kfupm.edu.sa/40511/1/40511.pdf).

David Bindel et al; OceanStore: An Extremely Wide-Area Storage System; University of California, Berkeley Technical Report No. UCB/CSD-00-1102, 2000; 17 pages (http://oceanstore.cs.berkeley.edu/publications/papers/pdf/oceanstore-tr-may99.pdf).

Fay Chang et al; Bigtable: A Distributed Storage System for Structured Data; Proceedings of the 7th symposium on Operating systems design and implementation (2006), pp. 205-218 (http://www.citeulike.org/user/laurobeltrao/article/3765219).

Sanjay Ghemawat et al; The Google File System; Proceedings of 19th ACM Symposium on Operating Systems Principles, 2003, Session: File and storage systems; pp. 29-43 (http://portal.acm.org/citation.cfm?id=945450).

(Continued)

*Primary Examiner* — Sana Al Hashemi (57) ABSTRACT

Methods and systems are described that involve replica placement strategy for distributed systems. At the time of index creation, initial index replica placement is decided. The first index replica is placed locally on the current processing server node. This server node operates as a master host for the first replica. The other index replicas are placed on different hosts depending on the index type, split index or non-split index, and a set of criteria. For non-split indexes, the set of criteria includes: a number of recently created replicas per host, resource usage per host, and a total number of replicas per host. For split indexes, the set of criteria includes: a number of replicas of any split index part per host and a number of local first replicas of split index parts. If all criteria are equal, the first host in alphanumeric ordering receives a next replica.

21 Claims, 10 Drawing Sheets

OTHER PUBLICATIONS

Sage A. Weil et al; CRUSH: Controlled, Scalable, Decentralized Placement of Replicated Data; Proceedings of the 2006 ACM/IEEE conference on Supercomputing (2006) Session: Technical papers; Article No. 122; 12 pages (http://www.ssrc.ucsc.edu/Papers/weil-sc06.pdf).

Frank Schmuck et al; GPFS: A Shared-Disk File System for Large Computing Clusters; Proceedings of the Conference on File and Storage Technologies (2002), pp. 231-244 (http://www.almaden.ibm.com/storagesystems/projects/gpfs/Fast02.pdf).

Peter J. Braam et al; Lustre: The intergalactic file system; Proceedings of Ottawa Linux Symposium 2002; 7 pages (http://www.kernel.org/doc/ols/2002/ols2002-pages-50-54.pdf).

Sage A. Weil et al; Ceph: A Scalable, High-Performance Distributed File System; Proceedings of the 7th symposium on Operating systems design and implementation (2006), pp. 307-320 (http://www.ssrc.ucsc.edu/Papers/weil-osdi06.pdf).

* cited by examiner

REPLICA PLACEMENT STRATEGY FOR DISTRIBUTED DATA PERSISTENCE

TECHNICAL FIELD

Embodiments of the invention generally relate to the software arts, and, more specifically, to methods and systems for storing index replicas in a distributed system.

BACKGROUND

Systems for online analytical processing (OLAP) need to handle growing volumes of critical data and in the same time to meet challenging user requirements for fast response time and flexible support for complex or ad hoc queries on application data. Typically, the OLAP systems hold and process data in the main memory, which enables fast queries to be executed over large volumes of structured data. The data can be compressed in the main memory to eliminate the runtime cost of disk access and the structures may be optimized for sequential read. Further, the data may be indexed and stored in a persistence layer of the OLAP system. The persistence layer may provide storage of application data on local hard disks in a system network. However, storing data on local hard disks in a network requires implementing high availability and failover techniques, such as replication of the data, so that the data is not lost.

Replication ensures consistency between redundant resources, such as software or hardware components, improves reliability, fault-tolerance, or accessibility. The replication may be data replication if the same data is stored on multiple storage devices. The replication process should be transparent to an external user. Also, in a failover scenario, a failover of replicas should be hidden as much as possible. When data is replicated, the processes of handling incoming requests reply to read requests, and apply updates. By ensuring that the replicas see the same events in equivalent orders, they stay in consistent states and thus any replica can respond to queries. Besides consistency of replicas, the server nodes in a distributed system should be evenly loaded with replicas so that optimal application performance and network traffic is achieved.

SUMMARY

Methods and systems are described that involve replica placement strategies for distributed data persistence. In an embodiment, the method includes detecting creation of a split index including a plurality of split index parts. A first replica of a part of the split index is stored on a local host in a plurality of hosts, wherein the first replica is a local replica and the local host is a master host for the local replica of the split index part. A total number of replicas of any part of the split index that are stored on a first slave host is determined. If the total number of replicas stored on the first slave host is equal to the total number of replicas stored on a second slave host, then a total number of local replicas stored on the first slave host and on the second slave host is determined. If the total number of local replicas stored on the first slave host is equal to the total number of local replicas stored on the second slave host, then a second replica of the part of the split index is stored on the first slave host in alphanumeric order.

In an embodiment, the system includes a distributed system with a plurality of server nodes, wherein a server node from the plurality is designated as a master host for an index and rest of server nodes in the plurality are designated as slave hosts for the index. The system also includes a master unit that identifies most suitable hosts to place a set of replicas of the index, storing a first index replica locally to the master host and a next index replica on a slave host according to a set of parameters. If the parameters are equal for the slave hosts, the next index replica is stored on a first slave host in an alphanumeric order. Further, the system includes a data server module in communication with the master unit that stores index structure data and performs data replication and garbage collection.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for replica placement strategy for distributed data persistence are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiment.

When designing a replication strategy, the following aspects should be taken into consideration: what to replicate and where to put the replicas. The replication unit should be chosen according to the application's needs to achieve optimal performance of the system. To ensure efficient data placement in a distributed storage for an OLAP engine, not only commonly used criteria such as disk utilization, but also data semantics, e.g., how data is linked together, has to be considered.

Most OLAP engines handle data sets that are semantically bound together; therefore, data should be replicated at the level of a minimum logical unit of operations. The minimum logical unit of operation may be bigger than a common file system block or group of blocks. In an embodiment, the minimum logical unit of operations is an index that is organized hierarchically in namespaces and may contain: 1) content files (transactional data); 2) temporary files (uncompressed data); 3) attribute files (data stored in columns); 4) configuration files; etc. Typically, many midsize files (30-50 MB) containing millions of documents are created and written at once. The only small files (2-5 KB) are configuration files. Once written, files may not be modified frequently. In an embodiment, there are two types of modification: indexing (data is loaded into an index) and optimization (the index is compressed). During indexing, the data is stored in temporary files. During optimization, the data from the temporary files is read in parallel and written in attribute files.

Index processing depends on index size: small indexes may be processed sequentially by one host and large indexes may be split horizontally (since an index may represent a table of data, e.g., a fact table) and processed in parallel by all hosts in a system landscape. Indexes are semantic units and can be kept together wherever this is advantageous for their processing. Hence, only the large indexes are split, because the speedup benefit outweighs the logical complication caused by breaking up a semantic unit. Each portion of the attribute data may be handled by a different server, but with even distribution of the data, the servers may perform input/output operations at the same time. Parallel processing, consisting of large sequential read and write operations, may lead to shortage of the storage resources. To process queries in memory, the OLAP engines load the entire index into the main memory of the processing sever node. In addition, parts of a large index (table of column indexes) can be loaded separately as required to reduce memory consumption. Query execution can proceed when only the relevant parts of the index are loaded in the memory. Thus, all files of an index should be stored at one location, even when distributed storage is used. Typically, the main data structure of an OLAP system is the OLAP cube, which contains numeric facts called measures that are categorized by dimensions. The cube metadata may be created from a star schema of tables in a relational database. The star schema is the simplest style of a data warehouse schema that consists of a few fact tables (usually, only one) referencing a number of dimension tables. A data cube can be designed by selecting which measures and dimensions to be defined for each record in the cube. In an embodiment, indexes such as business warehouse indexes are based on the star scheme. These indexes represent structures that each contains a logical index and several table indexes. When a business warehouse index is split, the logical index and the smaller table indexes may advantageously remain unsplit; only the fact table index and the largest dimension table index may be split.

In a distributed persistence, two types of indexes may be distinguished: 1) a split index—a large index that is split into a plurality of parts; and 2) a non-split index—any other index. In an embodiment, a split index may be a fact table that contains most of the data in a cube index. The distribution of the split indexes may reflect the performance of the OLAP engine, since the split parts are indexed in parallel. Split indexes are evenly distributed over a cluster of several server nodes by means of horizontal partitioning. All replicas of the parts of each split index have to be distributed evenly among all hosts to achieve needed system performance.

Figure 1:
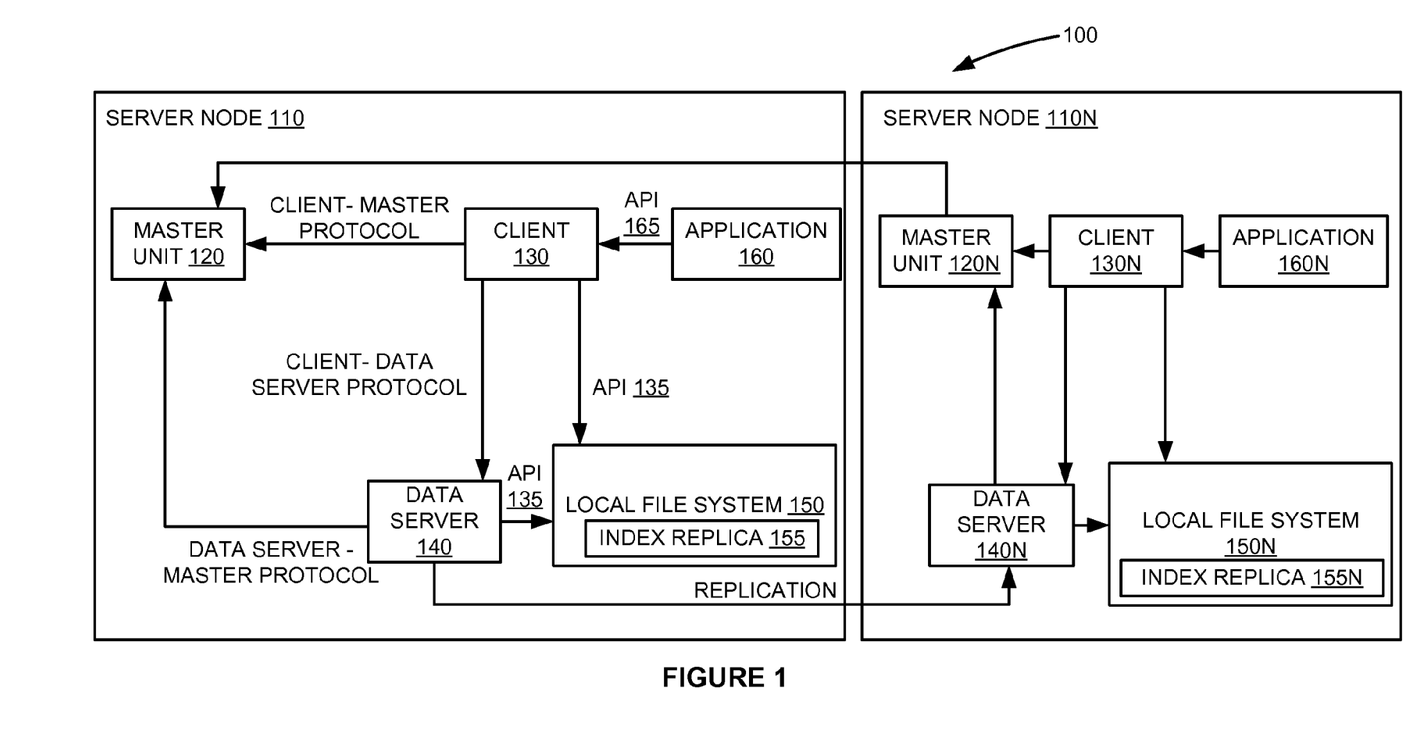
FIG. 1 is a block diagram of architectural components and their interactions in a distributed persistence layer, according to one embodiment.

FIG. 1 is a block diagram of architectural components and their interactions in a distributed persistence layer, according to one embodiment. A system landscape 100 contains a plurality of hosts from server node 110 to server node 110N. One host (e.g., server node 110) is designated as a master host for a given index replica 155 and all other hosts are designated as slave hosts (e.g., server node 110N) that may contain additional replicas of the same index (e.g., index replica 155N). A slave host is a server node, which is not designated as a master host for a particular index or part of index. Thus, each server node may be a master host for a particular index replica (or portion of the index) and a slave host for replicas of another index (or portion of another index) in the same time. While each server node includes a master unit 120 that provides the needed functionality, only one master unit is active (e.g., master unit 120) in the system landscape 100, all inactive master units (e.g., master unit 120N) forward requests to the active master unit 120. The server node where the master unit 120 is located may differ from the master host for an index. The master host performs read and write operations on given data, while the slave hosts may only read the data. The active master unit 120 handles index metadata and operations on it such as index creation, deletion, renaming, copy, and index replication. The metadata includes the following types: 1) index metadata; 2) index structure; and 3) runtime information. Index metadata may include, but is not limited to, index name, index state, and index-to-host mapping. Runtime information may include, but is not limited to, status of data servers and data load distribution. The master unit 120 may store the index metadata and runtime information in a tree structure in a local shared memory storage unit. Client 130 communicates with the master unit 120 or with a remote master unit 120N of the remote server node 110N if master unit 120 is not active for metadata operations. Further, the client 130 communicates with the local data server 140 and the remote data servers for any data operations.

Data server 140 stores and handles index structure data such as index directories, directory hierarchy, and file data. Data server 140 also performs background activity such as replication and garbage collection. If an index replica is stored locally on the host, client 130 reads the data of the index from the local file system 150 via an application programming interface (API) 135. Application 160 sends queries via a persistence layer API 165 to the client 130 to perform certain business logic that requires data from the stored index. Similarly, server node 110N includes elements: master unit 120N, client 130N, application 160N, local file system 150N, and data server 140N. The elements of server node 110N serve for managing any index replicas for which server node 110N is a master host and any index replicas for which server node 110N is a slave host.

During index creation or recovery, the active master unit 120 identifies the most suitable hosts to place the replicas of the index. Replicas are placed on hosts with the lowest disk space utilization and with the lowest estimated workload. The estimation is based on, including but not limited to, the total number of indexes on a host, the number of recently created replicas, and the role of the host (master or slave). In an embodiment, the first replica (primary replica) is stored locally on the master host; this ensures fast access to the index data and minimizes network traffic. The number of replicas may be defined according to the system's resources and needs, for example the number of replicas can be equal to the number of server nodes in the system. Initial replica placement is performed at the time of index creation.

There is a set of criteria for managing the initial placement of replicas depending on the index type (split or non-split index). The first criterion for placement of all index replicas is locality to minimize the network traffic. In a distributed environment, it is common to distinguish between active and passive server nodes, i.e., master and slaves. A master index server handles all requests to an index replica for which it is responsible. For example, server node 110 is a master server for index replica 155. Therefore, the master index server must always have a local replica. If there is no local replica, the master host has to perform read/write operations on a replica placed on a remote host, which decrease the performance and increases the network traffic. The placement of the other replicas of the index, apart from the first replica, is determined based on a set of parameters (e.g., total number of replicas for a host). In an embodiment, the set of parameters is predetermined and stored in an object: the parameters are collected, compared, and sorted for every host. Thus, statistical information for all hosts may be available, according to the set of parameters, when applying a replica placement strategy.

Figure 2:
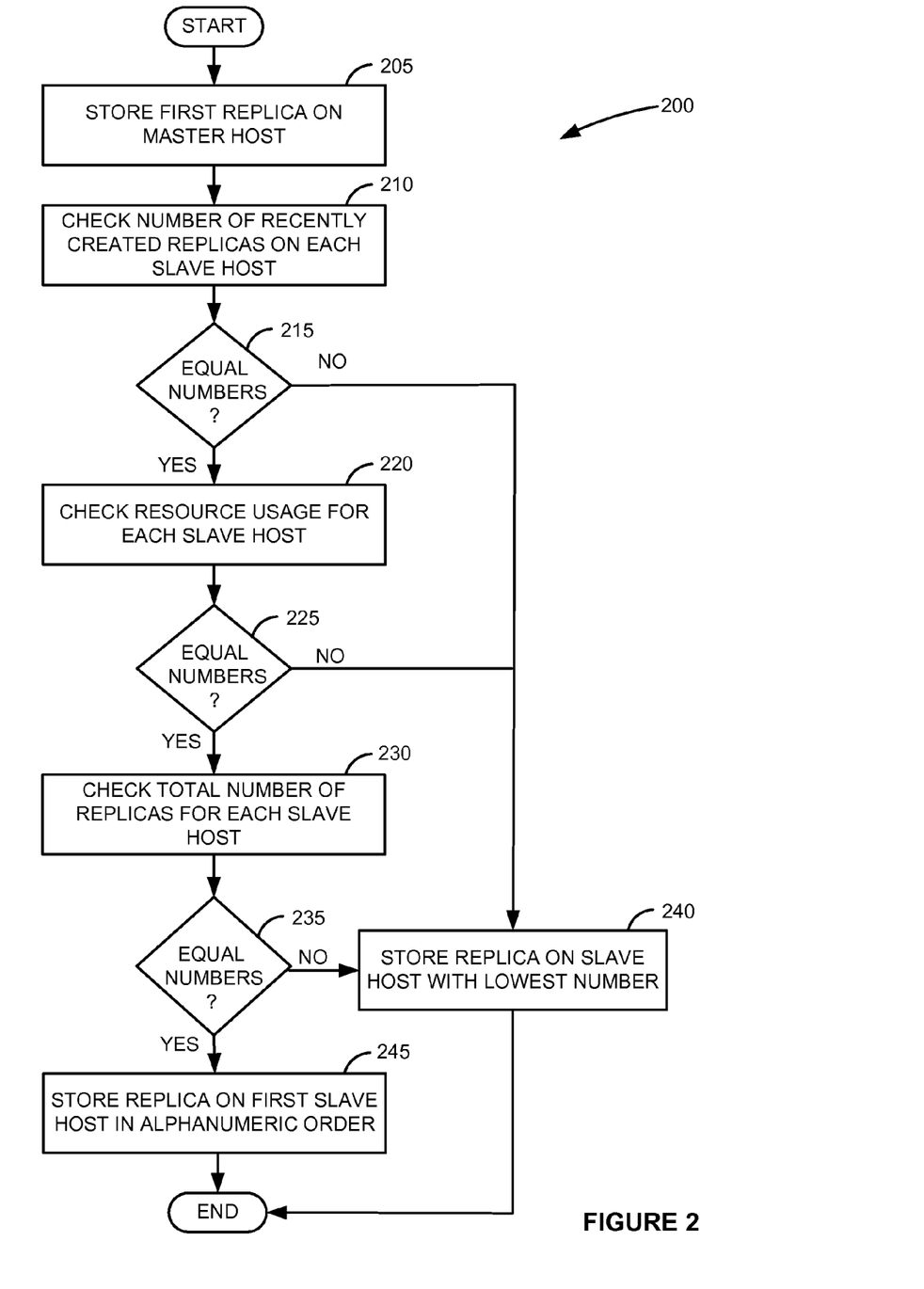
FIG. 2 is a flow diagram of an embodiment of a process for placing non-split index replicas in a distributed system environment.

FIG. 2 is a flow diagram of an embodiment of a process for placing non-split index replicas in a distributed system environment. Process 200 includes a number of steps for placing replicas of a non-split index in a distributed system. At step 205, the first replica of the non-split index is stored on the master host in the distributed system. Typically, the local processing host is designated as a master host (e.g., serve node 110) and the first replica stored may be referred to as a local replica (e.g., index replica 155). The number of replicas may depend on the number of hosts in the distributed system and the needed level of replication of the data. At the time of selecting the most appropriate hosts for the replicas, the stored predetermined parameters are checked.

For a non-split index, the set of parameters may include: 1) a number of recently created replicas—correlates to the volume of data which will be loaded in the fill process following the index creation; 2) hard disk utilization—needed for equalization of the disk space usage over the server nodes; and 3) a total number of replicas—corresponds to the potential number of input/output requests to a host. These parameters serve as criteria for determining the host for storing the next replica so that best application performance is achieved. During replica placement, the parameters are checked in a certain priority: the number of recently created replicas parameter has the highest priority, while the total number of replicas parameter has the lowest priority. A parameter with lower priority is checked only if the result of checking a parameter with higher priority does not affect the replica placement decision. For example, hard disk utilization is checked if the number of recently created replicas is equal for all slave hosts and thus, no replica placement decision can be taken.

At step 210, the number of recently created non-split index replicas of all slave hosts is checked. At decision step 215, the lowest number has to be determined. If all numbers of recently created non-split index replicas of all slave hosts are equal, then the process continues at step 220. Otherwise, the process continues at step 240. At step 220, the resource usage (e.g., disk usage) parameter of all slave hosts is checked. At decision step 225, the lowest number has to be determined. If all resource usage parameters have equal numbers, then the process continues at step 230. Otherwise, the process continues at step 240. At step 230, the total number of replicas of the non-split index for every host is checked. At decision step 235, the lowest number has to be determined. If all total numbers of all slave hosts are equal, then the process continues at step 245. Otherwise, the process continues at step 240. At step 240, the second non-split index replica is stored on the host with the lowest number for a given parameter. For example, if at step 215, it is determined that number of recently created non-split index replicas is not equal for all slave hosts, then the process continues at step 240, where the second replica is placed on the host with the lowest number of recently created non-split index replicas. At step 245, the second replica is stored on the first next host in the alphanumeric ordering. It should be noted that only the first replica is placed on the master host and steps 210-245 are executed for every other replica of the non-split index.

Figure 3:
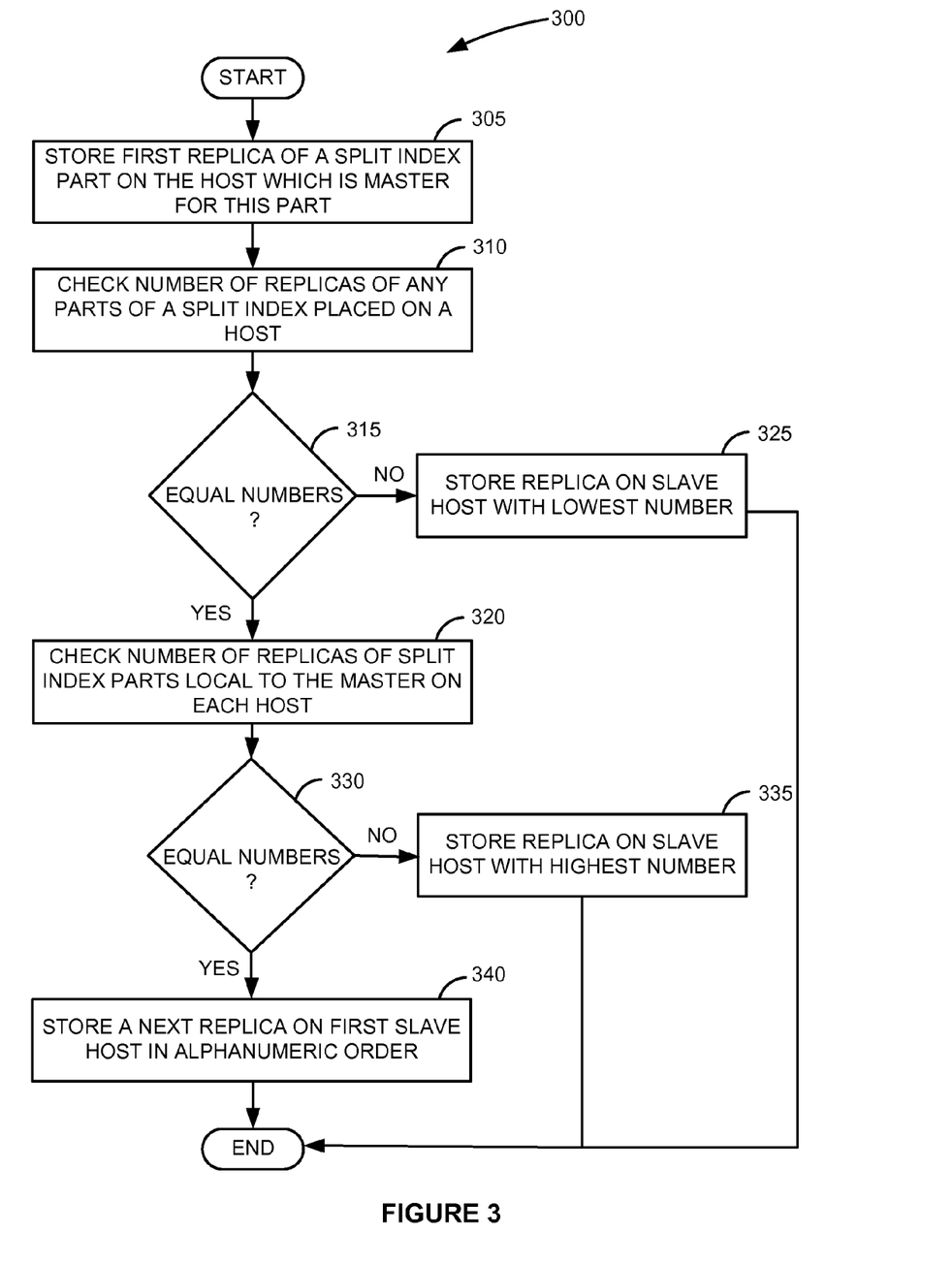
FIG. 3 is a flow diagram of an embodiment of a process for placing split index replicas in a distributed system environment.

FIG. 3 is a flow diagram of an embodiment of a process for placing split index replicas in a distributed system environment. Process 300 includes a number of steps for placing replicas of parts of a split index in a distributed system. The split index consists of a plurality of parts that were formed by splitting (e.g., horizontally) a given index, so that all parts can be evenly distributed among different hosts and processed in parallel. Each part of the plurality of parts may have a number of replicas depending on the system landscape and the replication requirements. The replicas of all parts have to be evenly distributed as well. Process 300 shows the distribution of a first and a next replica of a part of a split index. However, process 300 is applied to all replicas of every part of the split index.

At step 305, the first replica of each part of the split index is stored on a host which is assigned as master for this particular part. Thus, each first replica for a given part is local for the corresponding master host. Each host in the distributed system is assigned as master host for some parts of the split index and is a slave host for all other replicas of parts of the split index that are or will be stored on it.

Similarly to the non-split index, at the time of selecting the most appropriate hosts for the replicas, the stored predetermined parameters are checked and considered. For a split index, the set of parameters may include: a number of replicas of any parts of the split index that have already been placed on a given host—an approximately equal number of replicas of split index parts should be placed on each host. If some hosts have more replicas of the split index parts than others, their local disk drives will need to write larger amounts of data, which may lead to longer overall indexing time. Also, the disk of a host with fewer replicas will not be fully utilized. The set of parameters includes also: a number of replicas of parts of the split index local to a particular master host—the next replica should be placed on the host with the most local replicas, because in horizontal partitioning, the split parts of the index are distributed evenly and the host with the least number of assigned parts will become the next master. By not placing the replica on this host (when number of all replicas of split index parts is equal among all hosts), overloading of the host is avoided, because it will get a local first replica of the next split part.

At step 310, the number of replicas of any parts of a split index placed on a given host is checked. The number is checked for all slave hosts in the system. At decision step 315, the lowest number has to be determined. If the number of replicas of any parts of a split index is equal for all slave hosts, then the process continues at step 320. Otherwise, the process continues at step 325.

At step 325, the second replica of the split index part is stored on the host with the lowest number. The second replica is placed and process 300 ends. At step 320, the number of replicas of the split index parts that are local to the master on a given host is checked. The number is checked for all slave hosts in the system. At decision step 330, the highest number has to be determined, i.e., the host that has the most local replicas. If the number of local replicas of any parts of a split index is equal for all slave hosts, then the process continues at step 340. Otherwise, the process continues at block step 335. At block step 335, the second replica of the split index part is stored on the host with the highest number. At step 340, the second replica is stored on the first next host in the alphanumeric ordering. Similarly, steps 310-340 are executed for every other replica of the split index part.

FIGS. 4-9 are examples of replica distribution strategies for non-split and split indexes according to process 200 and process 300. For all figures, a cluster with four server nodes (hosts) is set up. For simplicity, replication factor 2 is used for the cluster, i.e., every index in FIGS. 4-9 has two replicas. Every split index has four parts, as the number of hosts in the cluster is four. Every split index has eight replicas of split index parts (four parts with two replicas each). Further, for part 1 of the split index, the assigned master index server is on host 1; for part 2, the master is on host 2; for part 3, the master is on host 3; and for part 4, it is on host 4.

Figure 4:
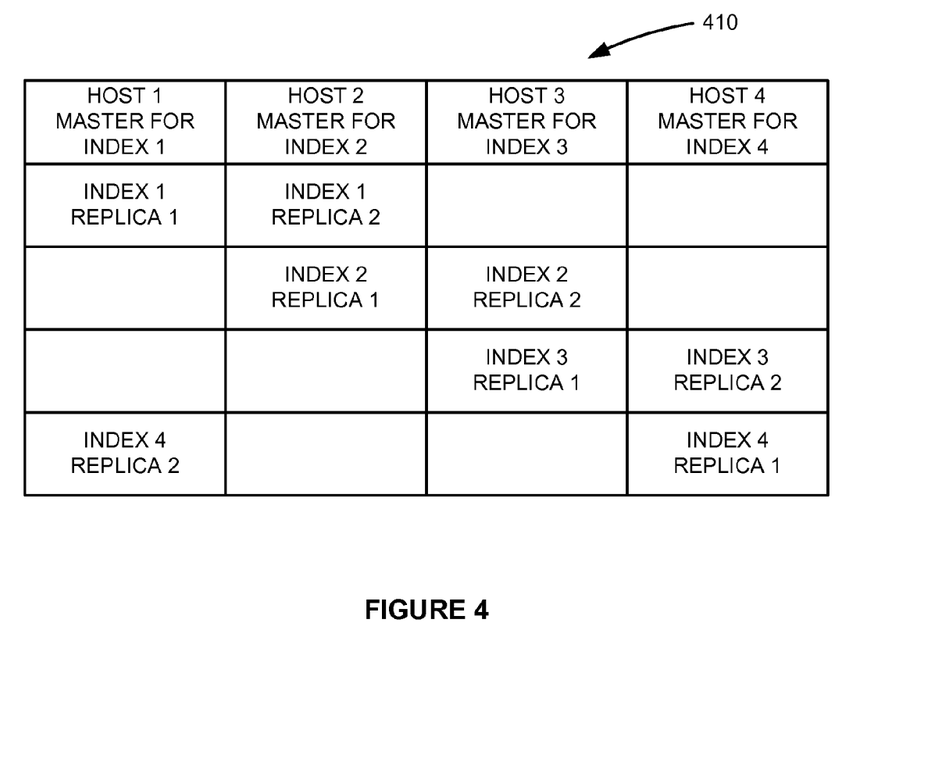
FIG. 4 is a replica distribution example for a non-split index, according to an embodiment.

FIG. 4 is a replica distribution example for a non-split index, according to an embodiment. Table 410 shows an even distribution of four non-split indexes and their replicas according to process 200. Since the index server roles are considered, each master index server has a local replica and the other replicas are distributed evenly among the hosts. For example, the first replicas of the four indexes are placed locally to the corresponding hosts, i.e., index 1 replica 1 is placed on host 1 and so on (according to step 205). For simplicity, in all examples the indexes are created sequentially, i.e. one after another. Thus, each single row in table 410 (this is also valid for FIGS. 5-9) means an index creation and placements of its replicas. First, index 1 is created and replica 1 of index 1 is placed. Then, replica 2 of index 1 is placed. Afterwards, index 2 is created and replica 1 of index 2 is placed. Then replica 2 of index 2 is placed and so on for the other indexes and their replicas. After placing index 1 replica 1, host 1 is automatically skipped in the rest of the replica placement process for non-split index 1, as it already contains a replica of index 1 (i.e., replica 1). The second replica of the non-split index 1 (index 1 replica 2) has to be placed. According to step 210, the number of recently created replicas for all slave hosts is checked. Since host 2, host 3, and host 4 does not contain any replicas, the number of recently created replicas for all slave hosts is equal (i.e., equal to 0). According to step 220, the resource usage of all slave hosts is checked. For simplicity reasons, the resource usage is even for all slave hosts. According to step 230, the total number of replicas for each slave host is checked. At this point, all slave hosts do not have any replicas. Therefore, the number is equal for all hosts. According to step 245, the second replica of non-split index 1 (index 1 replica 2) is stored on the next host in an alphanumeric order, this is host 2. Similarly, the other replicas of the non-split indexes are placed on the corresponding hosts.

Figure 5:
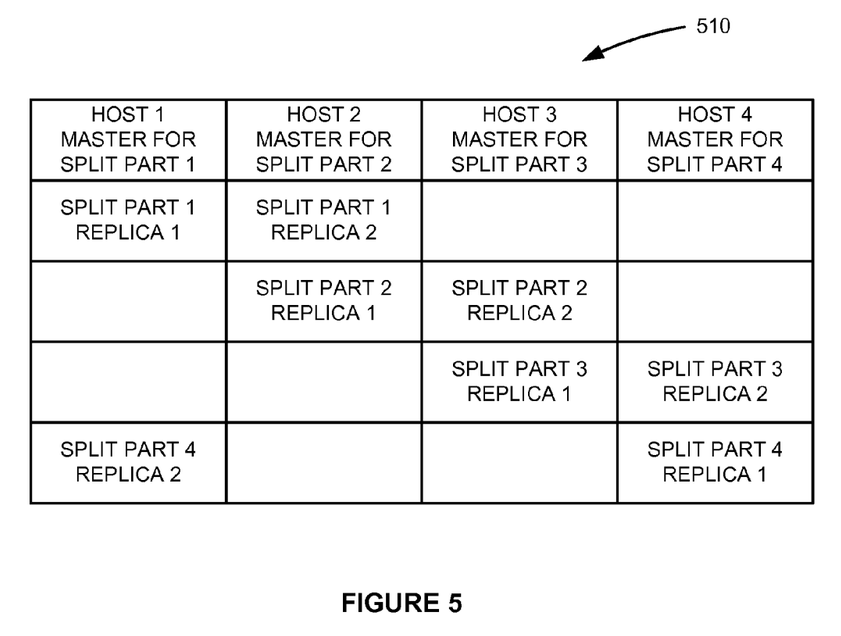
FIG. 5 is a replica distribution example for a split index, according to an embodiment.

FIG. 5 is a replica distribution example for a split index, according to an embodiment. Table 510 shows an even distribution of four split index parts and their replicas according to process 300. Since the index server roles are considered, each master index server has a local replica of a split index part and the other replicas are distributed evenly among the hosts. The first replica of the first split index part (split part 1 replica 1) is placed on host 1 (according to step 305). Then, host 1 is automatically skipped in the rest of the replica placement process for split index part 1, as it already contains a replica (i.e., split part 1 replica 1). The second replica of the split index part 1 (split part 1 replica 2) has to be placed. Following process 300, the second replica is stored on host 2. Similarly, the other replicas of the split index parts are placed on the corresponding hosts.

Figure 6:
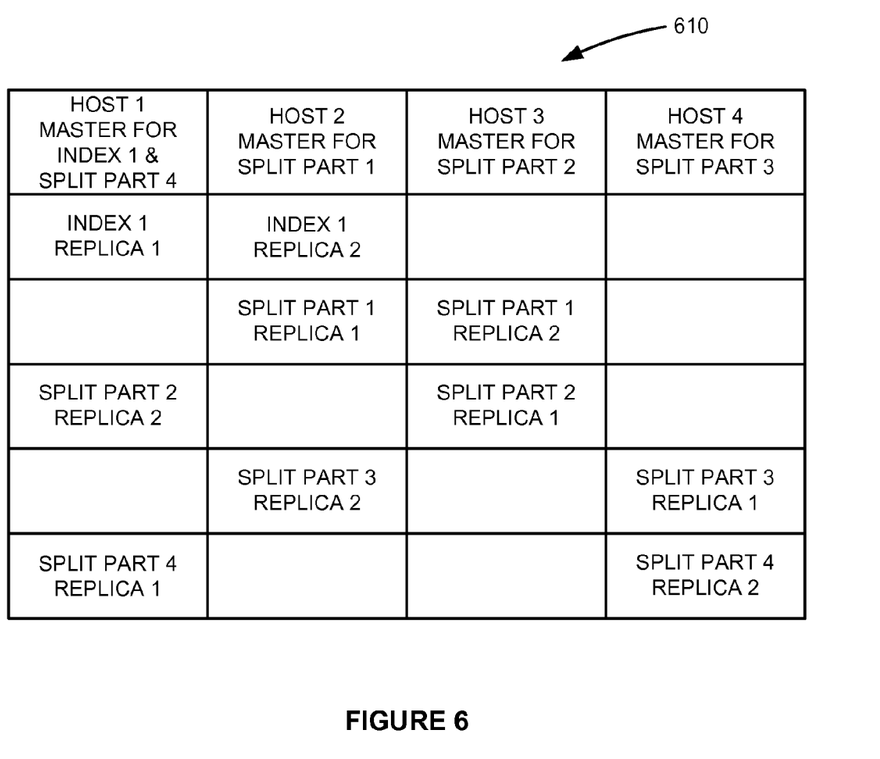
FIG. 6 is a replica distribution example for placing a non-split index and a split index, according to an embodiment.

FIG. 6 is a replica distribution example for placing a non-split index and a split index, according to an embodiment. Table 610 shows an even distribution of non-split index replicas and four split index parts and their replicas according to processes 200 and 300. First a non-split index is created; two replicas have to be placed. The first replica is placed on host 1 (i.e., index 1 replica 1), the second replica is placed on host 2 according to process 200 (i.e., index 1 replica 2). Then, a split index with four parts is created, each part has two replicas. Since host 2 is assigned as master for split part 1, the first replica of the first split index part (i.e., split part 1 replica 1) is placed on the host 2 (step 305); the next replica (i.e., split part 1 replica 2) is placed on host 3, which does not have any replicas and is next in the alphabetic order (step 340). Similarly, the replicas of the second part are placed on host 3 and 2. The first replica of third split index part is placed on host 4, but the next replica (split part 3 replica 2) is placed on host 2 according to step 320 (the hosts 1 and 2 are both suitable, but host 1 is a master host for split index part 4 and has no local replica). The first replica of part 4 (split part 4 replica 1) is then placed on host 1, and the second replica of part 4 is placed on host 4 according to step 310. If the algorithm did not consider the number of local replicas for the master hosts of split index parts, then the second replica of split part 3 (split part 3 replica 2) and first replica of split part 4 (split part 4 replica 1) would be placed on host 1. This would lead to uneven distribution.

Figure 7:
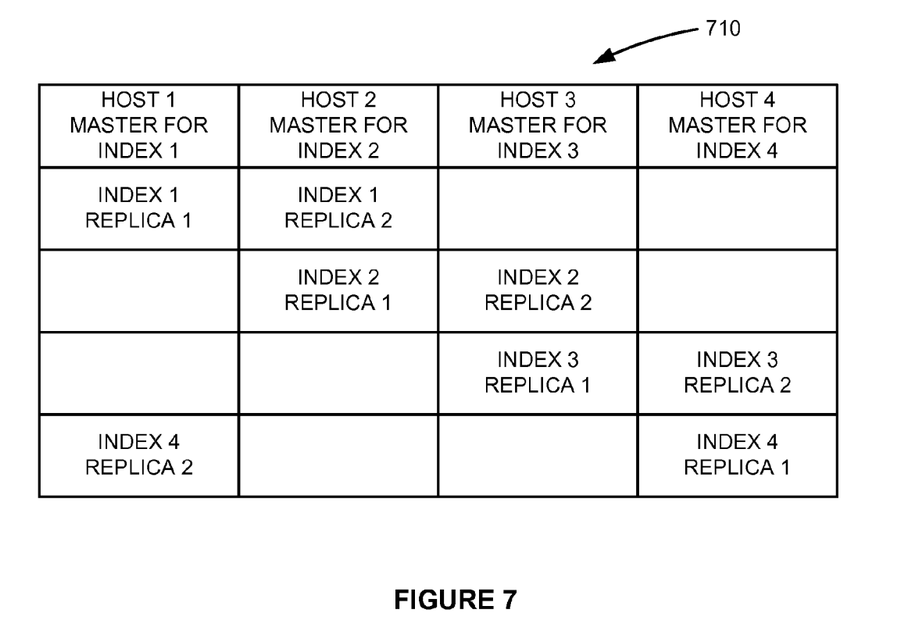
FIG. 7 is a replica distribution example for placing non-split indexes and their replicas in a system with different resource usage by the server nodes, according to an embodiment.

FIG. 7 is a replica distribution example for placing non-split indexes and their replicas in a system with different resource usage by the server nodes, according to an embodiment. In this example, host 1 has less resource usage (e.g., more free disk space) than all other hosts. Table 710 shows an even distribution of non-split indexes and their replicas according to process 200. First, the index server role is considered and the number of recently created replicas (step 205 and step 210). Then, the resource usage (e.g., free disk space) of each of the slave hosts is determined (step 220). Thus, each host has a local replica of a corresponding non-split index and the other replicas are distributed evenly. Before placing non-split index 4 replica 2, host 1 is the host with the lowest number of recently created indexes. Thus, non-split index 4 replica 2 is placed on host 1 (step 210). If non-split index 2 would now need a third replica, the third replica would be stored on host 1, as the number of recently created index replicas would be equal for all slave hosts and host 1 is with less resource usage (e.g., more free disk space), according to step 220.

Figure 8:
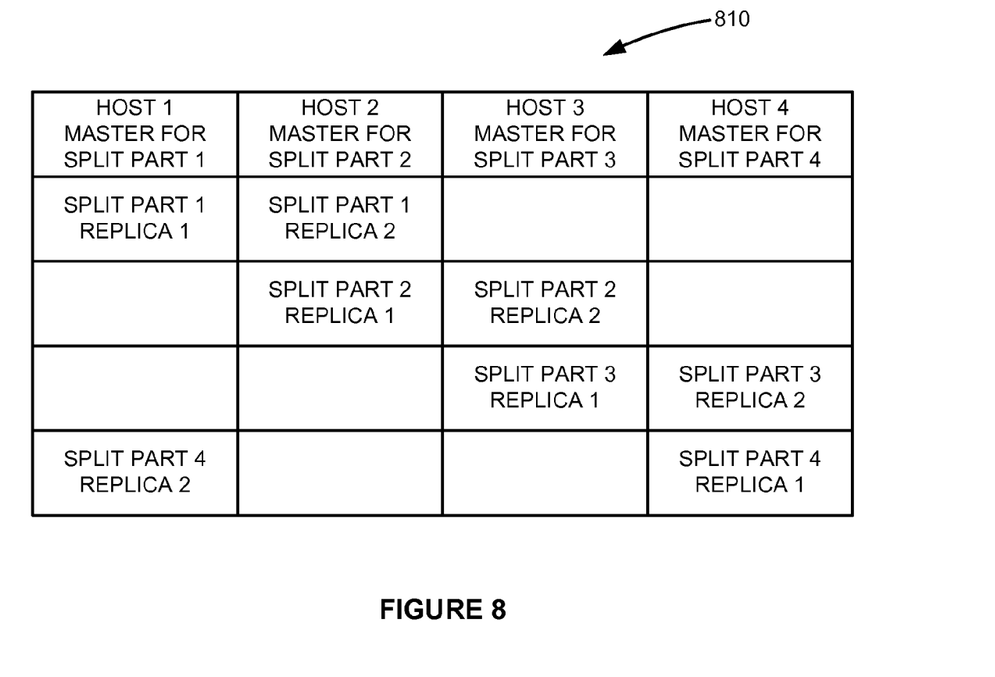
FIG. 8 is a replica distribution example for placing a split index with four split parts and their replicas in a system with different resource usage by the server nodes, according to an embodiment.

FIG. 8 is a replica distribution example for placing a split index with four split parts and their replicas in a system with different resource usage by the server nodes, according to an embodiment. Table 810 shows an even distribution of a split index parts and their replicas according to process 300. First, the index server role is considered and then the number of replicas of any parts of the split index on a host (steps 305 and 310). Process 300 disregards the resource usage by the server nodes in the cluster; the distribution of the replicas is analogous to the distribution in FIG. 5.

Figure 9:
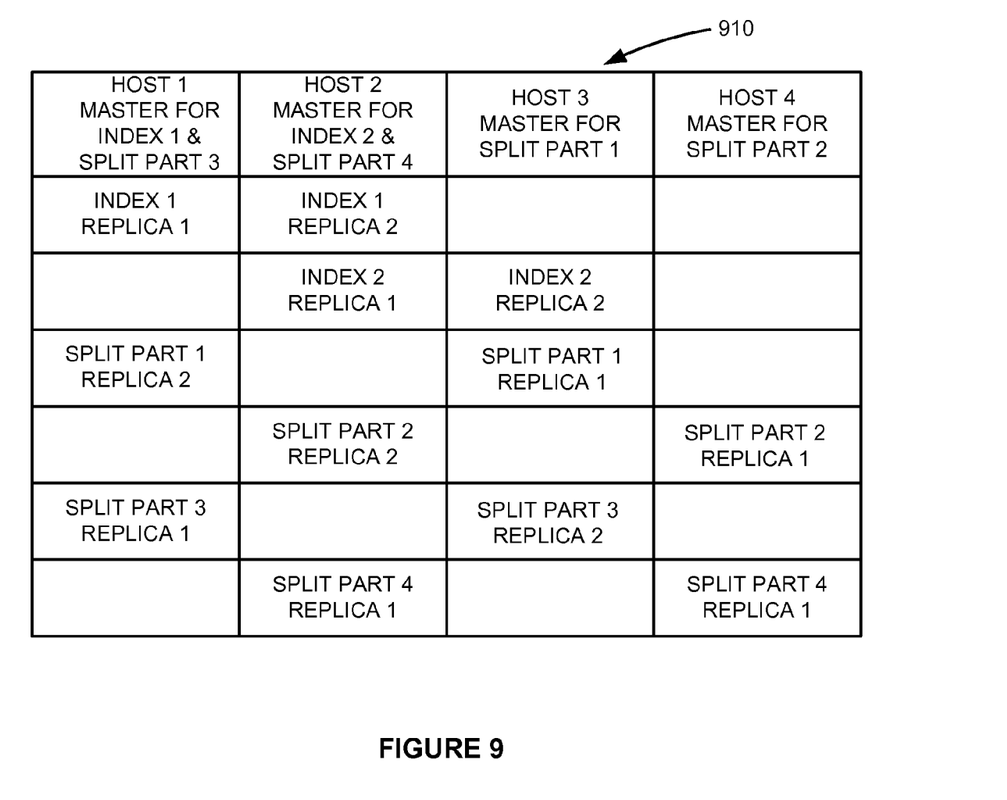
FIG. 9 is a replica distribution example for placing non-split indexes and a split index and their replicas, into a system with different resource usage, according to an embodiment.

FIG. 9 is a replica distribution example for placing non-split indexes and a split index and their replicas, into a system with different resource usage, according to an embodiment. This is a common case in OLAP applications, since usually many non-split indexes are created prior to split indexes and there is a high possibility that one host has more disk space than others, as after creating and filling many indexes, the disc utilization may become uneven. The distributed system includes four server nodes, as one of them has more free space than the others. Then, two non-split indexes are created prior to creation of a split index with four split parts. Table 910 shows a distribution of non-split index replicas and four split index parts and their replicas according to processes 200 and 300. The even distribution of split index replicas is achieved because of considering the index server role for every index and disregarding the free space and recent creations for the replicas of the split index parts. Further, because the algorithm considers the number of masters for the split index parts (step 320), the second replica of split index 3 is placed on host 3, instead of host 2 together with the first replica of split index 4. Despite the fact that non-split index replicas are not evenly distributed (host 2 has more replicas than host 4), this does not affect the indexing performance since the non-split indexes are filled in sequentially prior to filling of the split index.

An index is considered as consistent if the application always sees the same data, regardless from which replicas it reads. Index data consistency can be achieved by synchronous modification of all replicas. If an operation on a replica fails, the replica is marked as corrupted and the application reads another replica. Corrupted replicas are not operated on or replicated. Replica recovery may be initiated as soon as the number of available replicas falls below a defined replica level. Then, a new replica host may be chosen according to process 200 and process 300. During index replication, all write requests to that index are blocked until the replication is complete. In an embodiment, replica migration can be initiated asynchronously to ensure that data is stored on the hosts where it is needed. To ensure local access, an additional data copy may be created on the target host. The active master unit 120 later deletes the surplus replica on a slave host. The slave host for deleting the replica from is chosen by applying same criteria as for the initial placement, but considering the least appropriate host for a replica (e.g., most recent creations, highest resource utilization, etc.) A garbage collection mechanism for recognizing and deleting obsolete replicas may be implemented. Every data server 140 sends a list of local indexes both at startup and regularly thereafter to the active master unit 120. If the replica is not listed on the master unit 120, the data server 140 deletes it.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media storing one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
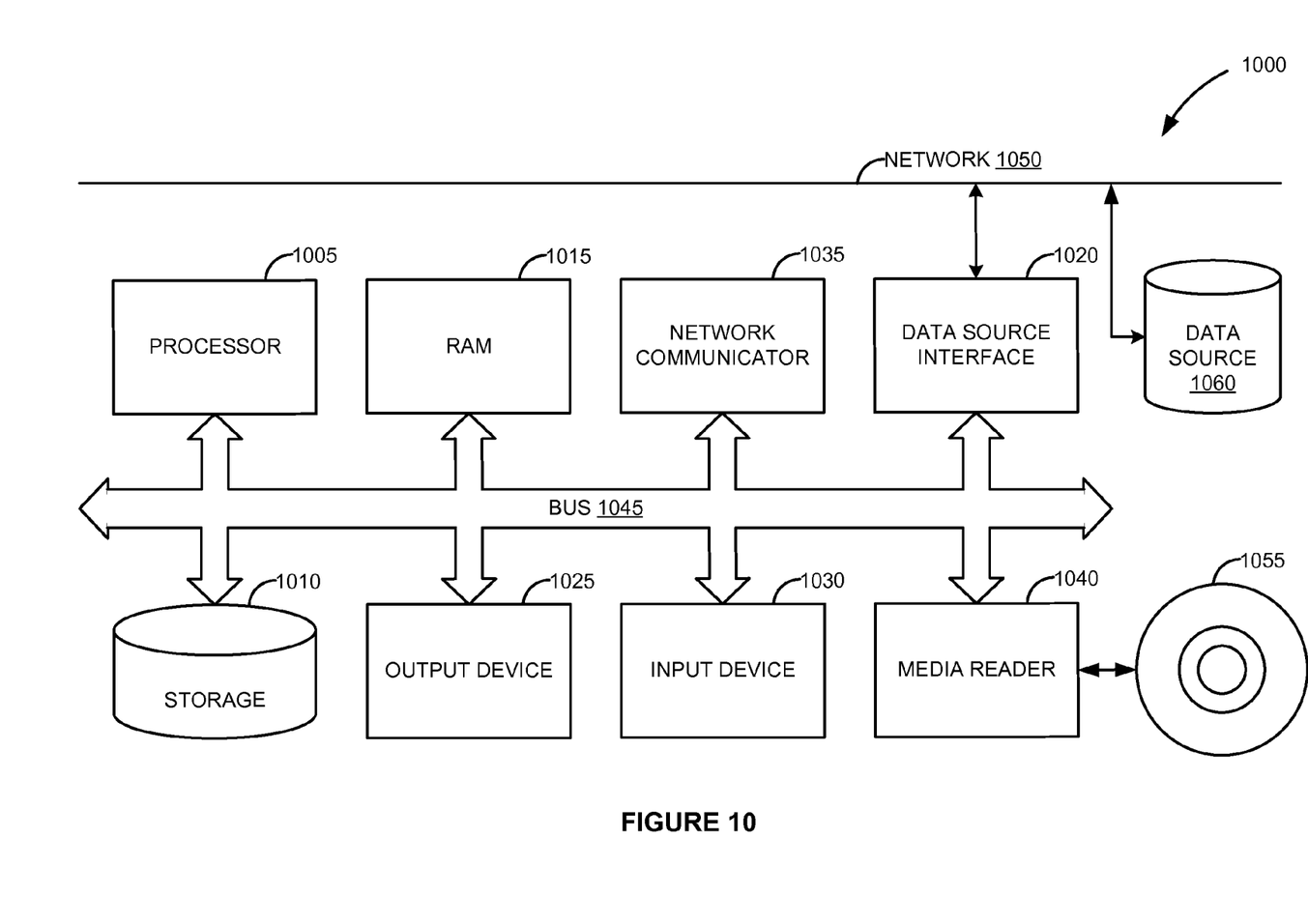
FIG. 10 is a block diagram of an exemplary computer system 1000.

FIG. 10 is a block diagram of an exemplary computer system 1000. The computer system 1000 includes a processor 1005 that executes software instructions or code stored on a computer readable medium 1055 to perform the above-illustrated methods of the invention. The computer system 1000 includes a media reader 1040 to read the instructions from the computer readable medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be access via one or more abstraction layers implemented in hardware or software. For example, the data source 1060 may be access by network 1050. In some embodiments the data source 1060 may be accessed via an abstraction layer, such as, a semantic layer.

A data source 1060 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer-readable storage medium tangibly storing machine-readable instructions thereon, which when executed by the machine, cause the machine to perform operations comprising:
   detecting creation of one or more of a non-split index and a split index;
   storing a first replica of a part of the split index on a local host in a plurality of hosts, wherein the first replica is a local replica and the local host is a master host for the local replica of the split index part;
   determining a total number of replicas of any part of the split index that are stored on a first slave host;
   when the total number of replicas stored on the first slave host is equal to the total number of replicas stored on a second slave host, determining a total number of local replicas stored on the first slave host and on the second slave host;
   when the total number of local replicas stored on the first slave host is equal to the total number of local replicas stored on the second slave host, storing a second replica of the part of the split index on the first slave host;
   storing a first replica of the non-split index at the local host from the plurality of hosts, wherein the local host is the master host;
   determining a number of recently created non-split index replicas stored on rest of the plurality of hosts, wherein the rest of the plurality of hosts are slave hosts;
   when the number of recently created non-split index replicas stored on the first slave host is equal to the number of recently created non-split index replicas stored on the second slave host, determining resource usage by the first slave host and by the second slave host;
   when the resource usage is equal for both the first slave host and the second slave host, determining a total number of replicas for the first slave host and for the second slave host; and
   when the total number of replicas is equal for both slave hosts, storing a second replica of the non-split index on the first slave host.

2. A computer implemented method comprising:
   detecting creation of one or more of a non-split index and a split index;
   storing a first replica of a part of the split index on a local host in a plurality of hosts, wherein the first replica is a local replica and the local host is a master host for the local replica of the split index part;
   determining a total number of replicas of any part of the split index that are stored on a first slave host;
   when the total number of replicas stored on the first slave host is equal to the total number of replicas stored on a second slave host, determining a total number of local replicas stored on the first slave host and on the second slave host;
   when the total number of local replicas stored on the first slave host is equal to the total number of local replicas stored on the second slave host, storing a second replica of the part of the split index on the first slave host;
   storing a first replica of the non-split index at the local host from the plurality of hosts, wherein the local host is the master host;
   determining a number of recently created non-split index replicas stored on rest of the plurality of hosts, wherein the rest of the plurality of hosts are slave hosts;
   when the number of recently created non-split index replicas stored on the first slave host is equal to the number of recently created non-split index replicas stored on the second slave host, determining resource usage by the first slave host and by the second slave host;
   when the resource usage is equal for both the first slave host and the second slave host, determining a total number of replicas for the first slave host and for the second slave host; and
   when the total number of replicas is equal for both slave hosts, storing a second replica of the non-split index on the first slave host.

3. A computer system, comprising:
   a computer memory to store program code; and
   a processor to execute the program code to:
      detect creation of one or more of a non-split index and a split index;
      store a first replica of a part of the split index on a local host in a plurality of hosts, wherein the first replica is a local replica and the local host is a master host for the local replica of the split index part;
      determine a total number of replicas of any part of the split index that are stored on a first slave host;
      when the total number of replicas stored on the first slave host is equal to the total number of replicas stored on a second slave host, determine a total number of local replicas stored on the first slave host and on the second slave host;
      when the total number of local replicas stored on the first slave host is equal to the total number of local replicas stored on the second slave host, store a second replica of the part of the split index on the first slave host;

store a first replica of the non-split index at the local host from the plurality of hosts, wherein the local host is the master host;

determine a number of recently created non-split index replicas stored on rest of the plurality of hosts, wherein the rest of the plurality of hosts are slave hosts;

when the number of recently created non-split index replicas stored on the first slave host is equal to the number of recently created non-split index replicas stored on the second slave host, determine resource usage by the first slave host and by the second slave host;

when the resource usage is equal for both the first slave host and the second slave host, determine a total number of replicas for the first slave host and for the second slave host; and when the total number of replicas is equal for both slave hosts, store a second replica of the non-split index on the first slave host.

4. The computer-readable storage medium of claim 1, wherein the operations further comprise: when the total number of replicas stored on the first slave host is not equal to the total number of replicas stored on the second slave host, storing the second replica of the part of the split index on a slave host with a smallest total number of replicas of any part of the split index.

5. The computer-readable storage medium of claim 1, wherein the operations further comprise: when the total number of local replicas stored on the first slave host is not equal to the total number of local replicas stored on the second slave host, storing the second replica of the part of the split index on a slave host with a largest total number of local replicas.

6. The computer-readable storage medium of claim 1, wherein the split index includes a plurality of split parts stored on different hosts in the plurality of hosts to provide parallel processing of the data stored in the index.

7. The computer-readable storage medium of claim 1, wherein the operations further comprise: when the number of recently created non-split index replicas stored on the first slave host is not equal to the number of recently created non-split index replicas stored on the second slave host, storing the second replica of the non-split index on a slave host with a smallest number of recently created non-split index replicas.

8. The computer-readable storage medium of claim 1, wherein the operations further comprise: when the resource usage is not equal for both slave hosts, storing the second replica of the non-split index on a slave host with more resource capacity.

9. The computer-readable storage medium of claim 1, wherein the operations further comprise: when the total number of replicas is not equal for both slave hosts, storing the second replica of the non-split index on a slave host with a smallest total number of replicas.

10. The method of claim 2, further comprising:
when the total number of replicas stored on the first slave host is not equal to the total number of replicas stored on the second slave host, storing the second replica of the part of the split index on a slave host with a smallest total number of replicas of any part of the split index.

11. The method of claim 2, further comprising:
when the total number of local replicas stored on the first slave host is not equal to the total number of local replicas stored on the second slave host, storing the second replica of the part of the split index on a slave host with a largest total number of local replicas.

12. The method of claim 2, wherein the split index includes a plurality of split parts stored on different hosts in the plurality of hosts to provide parallel processing of the data stored in the index.

13. The method of claim 2, further comprising:
when the number of recently created non-split index replicas stored on the first slave host is not equal to the number of recently created non-split index replicas stored on the second slave host, storing the second replica of the non-split index on a slave host with a smallest number of recently created non-split index replicas.

14. The method of claim 2, further comprising:
when the resource usage is not equal for both slave hosts, storing the second replica of the non-split index on a slave host with more resource capacity.

15. The method of claim 2, further comprising:
when the total number of replicas is not equal for both slave hosts, storing the second replica of the non-split index on a slave host with a smallest total number of replicas.

16. The system of claim 3, wherein the processor further executes the program code to:
when the total number of replicas stored on the first slave host is not equal to the total number of replicas stored on the second slave host, store the second replica of the part of the split index on a slave host with a smallest total number of replicas of any part of the split index.

17. The system of claim 3, wherein the processor further executes the program code to:
when the total number of local replicas stored on the first slave host is not equal to the total number of local replicas stored on the second slave host, store the second replica of the part of the split index on a slave host with a largest total number of local replicas.

18. The system of claim 3, wherein the split index includes a plurality of split parts stored on different hosts in the plurality of hosts to provide parallel processing of the data stored in the index.

19. The system of claim 3, wherein the processor further executes the program code to:
when the number of recently created non-split index replicas stored on the first slave host is not equal to the number of recently created non-split index replicas stored on the second slave host, store the second replica of the non-split index on a slave host with a smallest number of recently created non-split index replicas.

20. The system of claim 3, wherein the processor further executes the program code to:
when the resource usage is not equal for both slave hosts, store the second replica of the non-split index on a slave host with more resource capacity.

21. The system of claim 3, wherein the processor further executes the program code to:
when the total number of replicas is not equal for both slave hosts, store the second replica of the non-split index on a slave host with a smallest total number of replicas.

* * * * *